United States Patent
Kuo et al.

(10) Patent No.: US 8,940,074 B2
(45) Date of Patent: Jan. 27, 2015

(54) PELLETIZED FERTILIZER AND METHOD FOR MANUFACTURING THE SAME

(71) Applicant: Chunghwa Picture Tubes, Ltd., Taoyuan (TW)

(72) Inventors: Chou-Chiang Kuo, New Taipei (TW); Che-Wei Chang, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 13/935,958

(22) Filed: Jul. 5, 2013

(65) Prior Publication Data

US 2014/0230503 A1    Aug. 21, 2014

(30) Foreign Application Priority Data

Feb. 19, 2013  (TW) .............................. 102105734 A

(51) Int. Cl.
| | |
|---|---|
| C05F 11/00 | (2006.01) |
| C05F 11/08 | (2006.01) |
| C05B 17/00 | (2006.01) |
| C05C 3/00 | (2006.01) |
| C05F 17/00 | (2006.01) |

(52) U.S. Cl.
CPC . *C05B 17/00* (2013.01); *C05C 3/00* (2013.01); *C05F 11/08* (2013.01); *C05F 17/0027* (2013.01)
USPC .................................................... 71/6; 71/11

(58) Field of Classification Search
None
See application file for complete search history.

(56) References Cited

U.S. PATENT DOCUMENTS

| | | | | |
|---|---|---|---|---|
| 4,434,231 | A * | 2/1984 | Jung .............................. | 435/178 |
| 5,503,652 | A * | 4/1996 | Kloepper et al. ................... | 71/6 |
| 5,770,787 | A * | 6/1998 | Montague et al. ............. | 47/57.6 |
| 6,309,440 | B1 * | 10/2001 | Yamashita ........................ | 71/27 |
| 6,919,172 | B2 * | 7/2005 | DePablo et al. ................ | 435/1.1 |
| 2003/0066322 | A1 * | 4/2003 | Perriello ........................... | 71/24 |
| 2009/0163365 | A1 * | 6/2009 | Bentlage et al. ............. | 504/360 |
| 2010/0139347 | A1 * | 6/2010 | Barati .............................. | 71/23 |
| 2010/0234222 | A1 * | 9/2010 | Gidekel et al. ................ | 504/101 |
| 2010/0313620 | A1 * | 12/2010 | Armbrust et al. ................ | 71/23 |
| 2011/0023565 | A1 * | 2/2011 | Yanik et al. ........................ | 71/11 |
| 2013/0239633 | A1 * | 9/2013 | Halos et al. .......................... | 71/7 |

(Continued)

FOREIGN PATENT DOCUMENTS

| | | |
|---|---|---|
| CN | 101007746 A | 8/2007 |
| CN | 102850123 A | 1/2013 |

(Continued)

OTHER PUBLICATIONS

Zhang Jin-ze et al., "The application of Starch/PVA Blend in Slow Release Fertilizer", China Plastics Industry, 10, 2007, TQ325.9, 1005-5770, pp. 60-62.

*Primary Examiner* — Wayne Langel
(74) *Attorney, Agent, or Firm* — WPAT, PC; Justin King

(57) ABSTRACT

A method for manufacturing pelletized fertilizer includes the following steps of: mixing a biodegradable material and a water-soluble polymer material to form a first mixture; mixing a polyol, water and a nutrient salt to form a second mixture; mixing the first mixture and the second mixture to form a conglomerating gathered third mixture, and stirring the conglomerating gathered third mixture to form small lumps of the third mixture; spraying probiotic endo spores on the small lumps of the third mixture to form a plurality of fertilizer blocks; heating the fertilizer blocks, and extruding the fertilizer blocks to form a fertilizer strip; and cutting the fertilizer strip to form a plurality of pelletized fertilizer.

18 Claims, 1 Drawing Sheet

(56) References Cited

U.S. PATENT DOCUMENTS

2014/0083148 A1* 3/2014 Kuo et al. .................... 71/23
2014/0143909 A1* 5/2014 Greenshields et al. ....... 800/298

FOREIGN PATENT DOCUMENTS

| TW | 436262 | 5/2001 |
|----|--------|--------|
| TW | I243642 | 11/2005 |

* cited by examiner

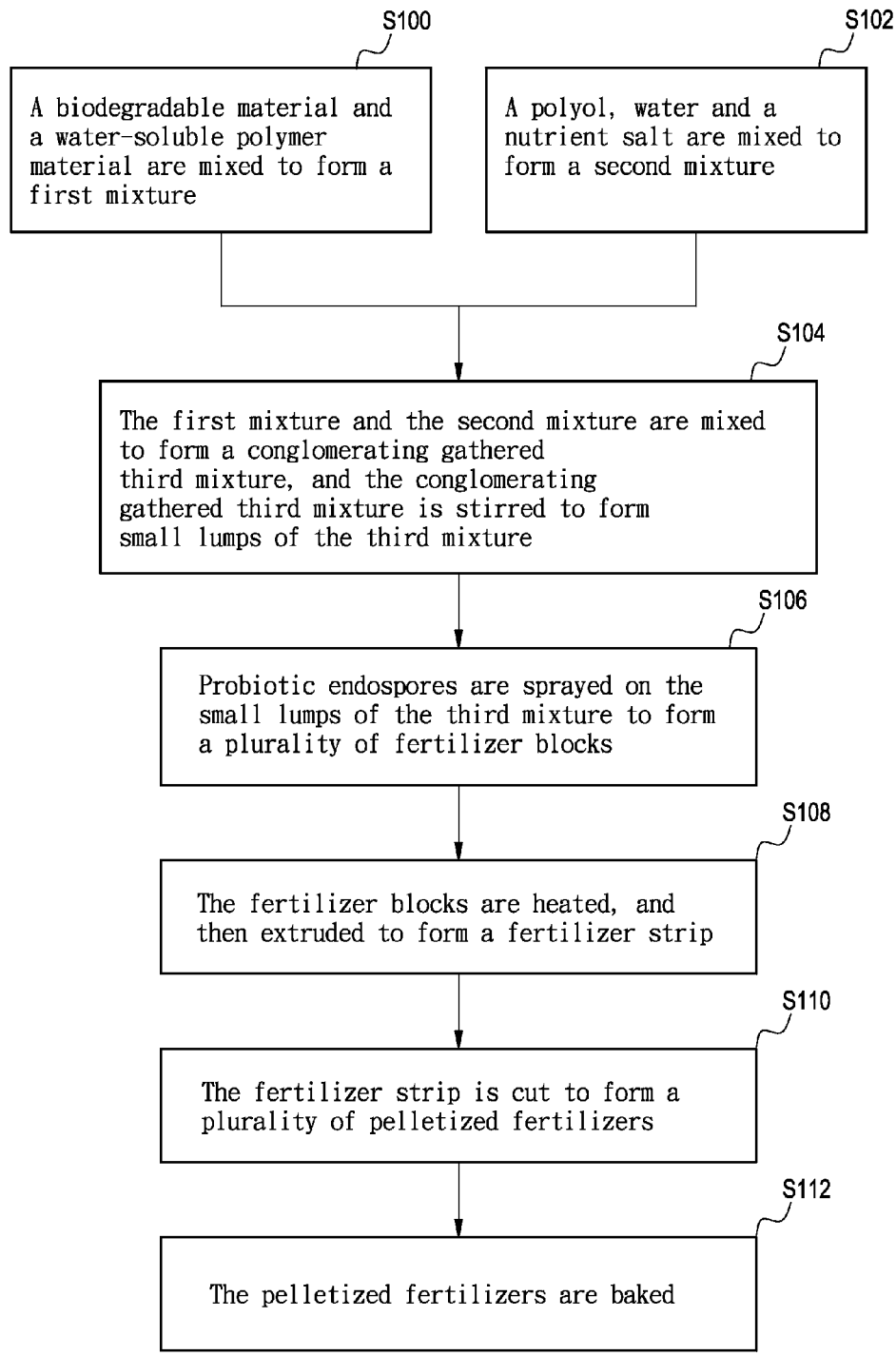

PELLETIZED FERTILIZER AND METHOD FOR MANUFACTURING THE SAME

CROSS-REFERENCE TO RELATED APPLICATION

This application claims the benefit of Taiwan Patent Application No. 102105734, filed on Feb. 19, 2013, which is hereby incorporated by reference for all purposes as if fully set forth herein.

BACKGROUND OF THE INVENTION

1. Field of Invention

This invention relates to a pelletized fertilizer and a method for manufacturing the pelletized fertilizer, and more particularly to a pelletized fertilizer and a method for manufacturing the pelletized fertilizer having probiotic endo spores.

2. Related Art

Recently, liquid microorganism pesticide or fertilizer is sprayed on a surface of the soil, or palletized microorganism pesticide or fertilizer is directly sprayed on a surface of the soil. Thus, pesticide or fertilizer cannot be deeply adjacent to roots of a plant in the soil such that the plant cannot be protected. Also, the preparation of microorganism actually includes probiotics having life or resting spores. If the microorganism pesticide or microorganism fertilizer is directly sprayed in the natural environment, there's no enough time to let the probiotics to be survived in the wild environment to greatly decrease the survival rate and function of the probiotics, because of factors (e.g., ultraviolet rays, changed temperature and natural enemies) of difficult survival in the natural environment.

Accordingly, there exists a need for a pelletized fertilizer and a method for manufacturing the pelletized fertilizer having probiotic endospores, the pelletized fertilizer capable of solving the above-mentioned problems.

SUMMARY OF THE INVENTION

It is an objective of the present invention to provide a pelletized fertilizer and a method for manufacturing the pelletized fertilizer, the pelletized fertilizer capable of convenient preservation and usage.

In order to achieve the objective, the present invention provides a method for manufacturing a pelletized fertilizer includes the following steps of: mixing a biodegradable material and a water-soluble polymer material to form a first mixture; mixing a polyol, some water and a nutrient salt to form a second mixture; mixing the first mixture and the second mixture to form a conglomerating gathered third mixture, and stirring the conglomerating gathered third mixture to form small lumps of the third mixture; spraying probiotic endospores on the small lumps of the third mixture to form a plurality of fertilizer blocks; heating the fertilizer blocks, and extruding the fertilizer blocks to form a fertilizer strip; and cutting the fertilizer strip to form a plurality of pelletized fertilizers.

The present invention further provides a pelletized fertilizer including: a biodegradable material including starch; a water-soluble polymer material selected from at least one of the group consisting of polyvinyl alcohol, carboxymethyl cellulose, xanthan gum, shellac, guar gum, natto gum, pectin and poly lactic-co-glycolic acid; a polyol; a nutrient salt; and probiotic endo spores; wherein the biodegradable material, the water-soluble polymer material, the polyol, the nutrient salt and the probiotic endo spores are mixed to one another.

The pelletized fertilizer of the present invention is capable of convenient preservation. During the usage, it is only necessary that the pelletized fertilizers are fully dissolved to water at a necessary ratio to form a solution of fertilizer hydrogel. Thus, the pelletized fertilizer of the present invention has an advantage of convenient usage.

To make the aforementioned and other objectives, features and advantages of the present invention comprehensible, embodiments are described in detail below with reference to the accompanying drawings.

BRIEF DESCRIPTION OF THE DRAWINGS

FIG. 1 is a flow chart of a method for manufacturing a pelletized fertilizer according to an embodiment of the present invention.

DETAILED DESCRIPTION OF THE INVENTION

FIG. 1 is a flow chart of a method for manufacturing a pelletized fertilizer according to an embodiment of the present invention. The method for manufacturing the pelletized fertilizer includes the following steps.

In step S100, a biodegradable material and a water-soluble polymer material are mixed to form a first mixture. In this step, the biodegradable material can be starch, e.g., modified starch or native starch. The water-soluble polymer material is selected from at least one of the group consisting of polyvinyl alcohol (PVA), carboxymethyl cellulose (CMC), xanthan gum, shellac, guar gum, natto gum, pectin and poly lactic-co-glycolic acid (PLGA). In this embodiment, the starch can be modified starch or native starch, e.g., corn starch. The water-soluble polymer material includes polyvinyl alcohol and carboxymethyl cellulose. The starch, polyvinyl alcohol and carboxymethyl cellulose are well mixed to the first mixture. The weight percent of the starch to the first mixture is between 10% and 30%. Preferably, the weight percent of the starch to the first mixture is between 20% and 25%. The weight percent of the carboxymethyl cellulose to the first mixture is between 10% and 30%. Preferably, the weight percent of the carboxymethyl cellulose to the first mixture is between 20% and 25%. The weight percent of the polyvinyl alcohol to the first mixture is between 25% and 45%. Preferably, the weight percent of the polyvinyl alcohol to the first mixture is between 35% and 40%.

In step S102, a polyol, water and a nutrient salt are mixed to form a second mixture. In this step, the polyol can be glycerol ($HOCH_2CHOHCH_2OH$). The nutrient salt is selected from at least one of the group consisting of ammonium chloride ($NH_4Cl$), maltodextrin, calcium carbonate ($CaCO_3$), magnesium sulfate ($MgSO_4$), ferric chloride ($FeCl_3$), glycine ($C_2H_5NO_2$), sodium chloride (NaCl), potassium dihydrogen phosphate ($KH_2PO_4$), aspartic acid and humic acid. In this embodiment, the glycerol, some water, humic acid and other nutrient salts (other nutrient salts according to different crops) are mixed to the second mixture. The second mixture is a water-soluble mixture, which can be plasticizer. The weight percent of the glycerol to the second mixture is between 10% and 16%.

In step S104, the first mixture and the second mixture are mixed to form a conglomerating gathered third mixture, and the conglomerating gathered third mixture is stirred to form small lumps of the third mixture. In this embodiment, for example, the weight ratio of the first mixture to the second mixture is 2:1, the second mixture is put into the first mixture slowly, the first mixture and the second mixture are well mixed to form a conglomerating gathered third mixture.

Then, the e conglomerating gathered third mixture is stirred fast in a mixer, the conglomerating gathered third mixture is scattered, and small lumps of the third mixture are formed to proceed with sequent process.

In step S106, probiotic endo spores are sprayed on the small lumps of the third mixture to form a plurality of fertilizer blocks. In this step, the probiotic endospores can be a concentrating culture fluid of the probiotic endo spores. In this embodiment, the concentrating culture fluid of the probiotic endospores is sprayed on the small lumps of the third mixture, the small lumps are well stirred gently to form the fertilizer blocks.

In step S108, the fertilizer blocks are heated, and then extruded to form a fertilizer strip. In this embodiment, the fertilizer blocks are put in an extruder to proceed with a mixing process. The extruder can heat the fertilizer blocks in four heating periods. The first heating period is that: the fertilizer blocks are heated at the temperature range between 140 and 145 degrees centigrade (° C.). The second heating period is that: the fertilizer blocks are heated at the temperature range between 145 and 150 degrees centigrade (° C.). The third heating period is that: the fertilizer blocks are heated at the temperature range between 165 and 170 degrees centigrade (° C.). The fourth heating period is that: the fertilizer blocks are heated at the temperature range between 135 and 140 degrees centigrade (° C.). Finally, the fertilizer blocks are extruded to the fertilizer strip by the extruder. The elapsed time of the fertilizer blocks in the extruder is approximately between 2 and 3 minutes.

In step S110, the fertilizer strip is cut to form a plurality of pelletized fertilizers. In this embodiment, the fertilizer strip is cut by a granule cutter, and the pelletized fertilizers are formed.

In step S112, the pelletized fertilizers are baked. In this embodiment, the pelletized fertilizers are heated at 40 degrees centigrade, and are baked within a keeping time. The keeping time can be between 24 and 48 hours. Finally, the baked pelletized fertilizers are put in a seal pot, and a drying agent is also put in the seal pot, whereby the pelletized fertilizers can be preserved at a room temperature.

Thus, the pelletized fertilizer according to the above-mentioned manufacturing method includes a biodegradable material (e.g., the biodegradable material at least includes starch), a water-soluble polymer material, a polyol, a nutrient salt and probiotic endo spores. The biodegradable material, the water-soluble polymer material, the polyol, the nutrient salt and the probiotic endospores are mixed to one another. The starch can be modified starch or native starch. The water-soluble polymer material is selected from at least one of the group consisting of polyvinyl alcohol, carboxymethyl cellulose, xanthan gum, shellac, guar gum, natto gum, pectin and poly lactic-co-glycolic acid. The nutrient salt is selected from at least one of the group consisting of ammonium chloride, maltodextrin, calcium carbonate, magnesium sulfate, ferric chloride, glycine, sodium chloride, potassium dihydrogen phosphate, aspartic acid and humic acid. In this embodiment, the starch is modified starch, and the polyol is glycerol. The water-soluble polymer material includes polyvinyl alcohol and carboxymethyl cellulose.

The pelletized fertilizers are used for seeds and seedlings. If the pelletized fertilizers are used for the seeds, the pelletized fertilizers are dissolved to water, and the pelletized fertilizers and water are formed to a solution of fertilizer hydrogel at a pre-determined ratio, which is the ratio of the pelletized fertilizers to water is between 1:5 and 1:10. Then the seeds are soaked in and then moved from the solution of fertilizer hydrogel before sowing. The solution of fertilizer hydrogel fully covers surfaces of the seeds to proceed with the sowing process.

If the pelletized fertilizers are used for the seedlings, the pelletized fertilizers are also dissolved to water, and the pelletized fertilizers and water are formed to a solution of fertilizer hydrogel at a pre-determined ratio, which is the ratio of the pelletized fertilizers to water is between 1:8 and 1:20. Then, tips and main bodies (except necks) of roots of the seedlings are soaked in and then moved from the solution of fertilizer hydrogel before sowing. The solution of fertilizer hydrogel fully covers surfaces of the roots of the seedlings to proceed with the sowing process.

Thus, the present invention has the following functions:

First, probiotics are easily grown in a wet environment, because the pelletized fertilizers of the present invention include the nutrient salt which is requested at the growth of probiotic endospores and microorganisms. The probiotics are grown greatly, the pelletized fertilizers include the humic acid, and thus the roots of the seedlings are protected, and a disease of the seedlings is decreased, whereby the seedlings can be grown helpfully.

Second, the pelletized fertilizers of the present invention can protect the seedlings, increase the survival rate of the sprouted seedlings, decrease the disease rate of the seedlings, and helpfully cause the seeds to be sprouted.

Third, the method for manufacturing the pelletized fertilizer of the present invention can effectively preserve the activity of the probiotic endospores in a long period.

Fourth, the pelletized fertilizers are biodegradable, and thus can be directly buried in the arable land for compost use. Also, the pelletized fertilizers are decomposed by microorganisms in the soil to increase the soil fertility.

Fifth, the pelletized fertilizer of the present invention is capable of convenient preservation. During the usage, it is only necessary that the pelletized fertilizers are fully dissolved to water at a necessary ratio to form a solution of fertilizer hydrogel. Thus, the pelletized fertilizer of the present invention has an advantage of convenient usage.

To sum up, the implementation manners or embodiments of the technical solutions adopted by the present invention to solve the problems are merely illustrative, and are not intended to limit the scope of the present invention. Any equivalent variation or modification made without departing from the scope or spirit of the present invention shall fall within the appended claims of the present invention.

What is claimed is:

1. A method for manufacturing pelletized fertilizer comprising the following steps of:

mixing a biodegradable material and a water-soluble polymer material to form a first mixture, wherein the water-soluble polymer material is selected from a group consisting of carboxymethyl cellulose, xanthan gum, shellac, guar gum, natto gum, pectin and poly lactic-co-glycolic acid;

mixing a polyol, water and a nutrient salt to form a second mixture;

mixing the first mixture and the second mixture to form a conglomerating gathered third mixture, and stirring the conglomerating gathered third mixture to form small lumps of the third mixture;

spraying probiotic endospores on the small lumps of the third mixture to form a plurality of fertilizer blocks;

heating the fertilizer blocks, and extruding the fertilizer blocks to form a fertilizer strip; and cutting the fertilizer strip to form a plurality of pelletized fertilizers.

2. The method as claimed in claim 1, wherein the biodegradable material is starch, and the weight percent of the starch to the first mixture is between 10% and 30%.

3. The method as claimed in claim 2, wherein the weight percent of the starch to the first mixture is between 20% and 25%.

4. The method as claimed in claim 1, wherein the water-soluble polymer material comprises polyvinyl alcohol and carboxymethyl cellulose, the weight percent of the carboxymethyl cellulose to the first mixture is between 10% and 30%, and the weight percent of the polyvinyl alcohol to the first mixture is between 25% and 45%.

5. The method as claimed in claim 4, wherein the weight percent of the carboxymethyl cellulose to the first mixture is between 20% and 25%.

6. The method as claimed in claim 4, wherein the weight percent of the polyvinyl alcohol to the first mixture is between 35% and 40%.

7. The method as claimed in claim 1, wherein the nutrient salt is selected from a group consisting of ammonium chloride (NH4Cl), maltodextrin, calcium carbonate (CaCO3), magnesium sulfate (MgSO4), ferric chloride (FeCl3), glycine (C2H5NO2), sodium chloride (NaCl), potassium dihydrogen phosphate (KH2PO4), aspartic acid and humic acid.

8. The method as claimed in claim 1, wherein the polyol is glycerol, and the weight percent of the glycerol to the second mixture is between 10% and 16%.

9. The method as claimed in claim 1, wherein the weight ratio of the first mixture to the second mixture is 2:1.

10. The method as claimed in claim 1, wherein the step of heating the fertilizer blocks comprises:
   heating the fertilizer blocks at the temperature range between 140 and 145 degrees centigrade in a first heating period;
   heating the fertilizer blocks at the temperature range between 145 and 150 degrees centigrade in a second heating period;
   heating the fertilizer blocks at the temperature range between 165 and 170 degrees centigrade in a third heating period; and
   heating the fertilizer blocks at the temperature range between 135 and 140 degrees centigrade in a fourth heating period.

11. The method as claimed in claim 1, further comprising the following steps of:
   heating the pelletized fertilizers at 40 degrees centigrade, and baking the pelletized fertilizers within a keeping time being between 24 and 48 hours.

12. The method as claimed in claim 1, wherein said first mixture comprises at least 10% starch, at least 10% carboxymethyl cellulose and at least 25% polyvinyl alcohol, and said polyol comprises glycerol.

13. The method as claimed in claim 1, wherein said biodegradable material comprises starch, said water-soluble polymer material comprises shellac, natto gum or poly lactic-co-glycolic acid, said polyol comprises glycerol, and said nutrient salt comprises potassium dihydrogen phosphate.

14. A pelletized fertilizer comprising:
   a biodegradable material including starch;
   a water-soluble polymer material selected from a group consisting of carboxymethyl cellulose, xanthan gum, shellac, guar gum, natto gum, pectin and poly lactic-co-glycolic acid;
   a polyol;
   a nutrient salt; and
   probiotic endospores;
   wherein the biodegradable material, the water-soluble polymer material, the polyol, the nutrient salt and the probiotic endospores are mixed to one another.

15. The pelletized fertilizer as claimed in claim 14, wherein the starch is modified starch or native starch.

16. The pelletized fertilizer as claimed in claim 14, wherein the water-soluble polymer material comprises polyvinyl alcohol and carboxymethyl cellulose.

17. The pelletized fertilizer as claimed in claim 14, wherein the polyol is glycerol.

18. The pelletized fertilizer as claimed in claim 14, wherein the nutrient salt is selected from a group consisting of ammonium chloride, maltodextrin, calcium carbonate, magnesium sulfate, ferric chloride, glycine, sodium chloride, potassium dihydrogen phosphate, aspartic acid and humic acid.

* * * * *